INVENTOR.
J. S. HUBBY
BY Young & Quigg
ATTORNEYS

May 25, 1965   J. S. HUBBY   3,185,661
PARTICLE AGITATION SYSTEM
Filed June 3, 1963   2 Sheets-Sheet 2

INVENTOR.
J. S. HUBBY
BY Young & Quigg
ATTORNEYS 3,185,661
PARTICLE AGITATION SYSTEM
John S. Hubby, Pasadena, Tex., assignor to Phillips Petroleum Company, a corporation of Delaware
Filed June 3, 1963, Ser. No. 285,084
2 Claims. (Cl. 260—34.2)

This invention relates to the storage and transportation of slurries.

In various industrial operations there is a need to store and transport slurries in such a manner as to prevent solid particles from settling out. For examply, in the polymerization of olefins to produce solid particles, the polymerization is often carried out in the presence of a liquid diluent or solvent. This solvent is subsequently recovered from the reactor effluent and normally recycled to the reactor. In such a process, it is usually desirable to purify the solvent by removing polymer fines which may be entrained. The storage and handling of the solvent prior to the fines removal step can create certain problems, particularly when the slurry must be stored prior to the final purification step. If solid particles are permitted to settle out, plugging and process upsets may result.

In accordance with this invention, a procedure is provided for storing and transporting slurries in such a manner as to prevent solid particles from settling out. This is accomplished by introducing the slurry into a storage vessel in such a manner as to agitate the contents of the vessel sufficiently to retain the particles in suspension. The storage vessel advantageously is a generally cylindrical vessel positioned so that its axis is a horizontal plane. An elongated header is disposed near the bottom of the vessel to introduce the slurry into the vessel at a plurality of spaced points. The header is provided with openings such that the slurry enters the vessel in directions generally tangential to the adjacent side wall of the vessel. This imparts a rolling motion to the slurry in the vessel and retains the solids in suspension. A heater can also be disposed in the vessel to retain slurry at a desired elevated temperature.

Accordingly, it is an object of this invention to provide apparatus for use in storing and transporting slurries in such a manner as to prevent particles from settling out of the slurry.

Another object is to provide a method retaining suspended particles in slurries during storage and transportation operations.

A further object is to provide a procedure for recovering and purifying liquid diluent employed in polymerization systems.

Other objects, advantages and features of the invention should become apparent from the following detailed description, taken in conjunction with the accompanying drawing in which.

Figure 1:
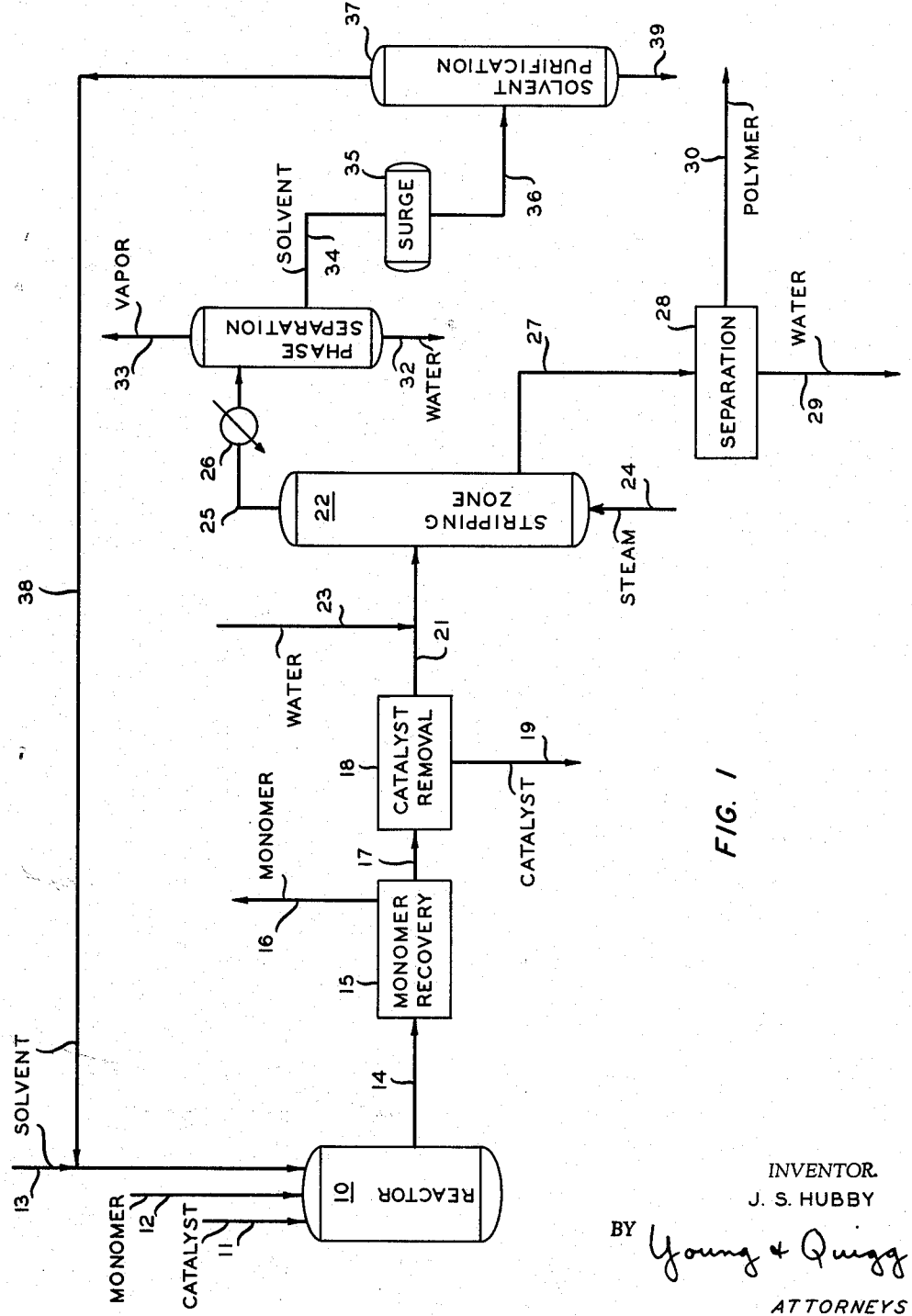
FIGURE 1 is a schematic representation of a polymerization process having the slurry storage and transportation system of this invention incorporated therein.

The slurry storage and transportation system of this invention is particularly useful in the recovery and purification of solvent employed in the polymerization of olefins, such as ethylene. A process of this type is illustrated schematically in FIGURE 1. Catalyst, monomer and solvent, such as cyclohexane, are introduced into a reactor 10 through respective conduits 11, 12 and 13. The reactor effluent is directed through a conduit 14 to a monomer recovery zone 15. Any unreacted monomer in the reactor effluent is normally flashed off and removed through a conduit 16. The effluent from recovery zone 15 is conveyed by a conduit 17 to a catalyst removal zone 18. The catalyst particles are therein removed by means of a suitable filter or a centrifuge, and are conveyed from the removal zone by means of a conveyor 19. The effluent from zone 18, which comprises primarily polymer and solvent, is transported by a conduit 21 to a stripping zone 22. Cool water is introduced into conduit 21 by means of a conduit 23 to lower the temperature sufficiently to precipitate the polymer from the solvent.

The temperature of stripping zone 22 is elevated, such as by the introduction of steam through a conduit 24, to vaporize the solvent present in the system. This solvent is removed through an overhead conduit 25 which has a condenser 26 therein. A slurry of water and polymer is removed from zone 22 through a conduit 27 which communicates with a separation zone 28. Water is removed from zone 28 through a conduit 29, and polymer is recovered through a conveyor 30. The temperature of the overhead stream from stripping zone 22 is reduced by condenser 26 so that most of the steam and solvent are introduced into a phase separation zone 31 in the liquid state. Water is removed from the bottom of zone 31 through a conduit 32. Any remaining vapor is removed from the top of zone 31 through a conduit 33. The liquid solvent, which contains polymer fines in suspension, is removed from an intermediate region of zone 31 through a conduit 34 and is introduced into a surge tank 35. This solvent is subsequently transported by means of a conduit 36 to the inlet of a solvent purification column 37. The purified solvent is removed from the top of column 37 by a conduit 38 and recycled to the inlet of reactor 10. Impurities removed from the solvent in column 37 are discharged through a conduit 39.

A certain amount of finely divided polymer is normally entrained in the solvent recovered from stripping zone 22 so that a dilute slurry of this polymer is introduced into surge tank 35. Prior to this invention, such polymer frequently settled out in the bottom of surge tank 35. Relatively large quantities of this polymer periodically were released from the surge tank into purification column 37. The polymer so released tended to clog the conduits and often upset the operation of the purification column.

Figure 2:
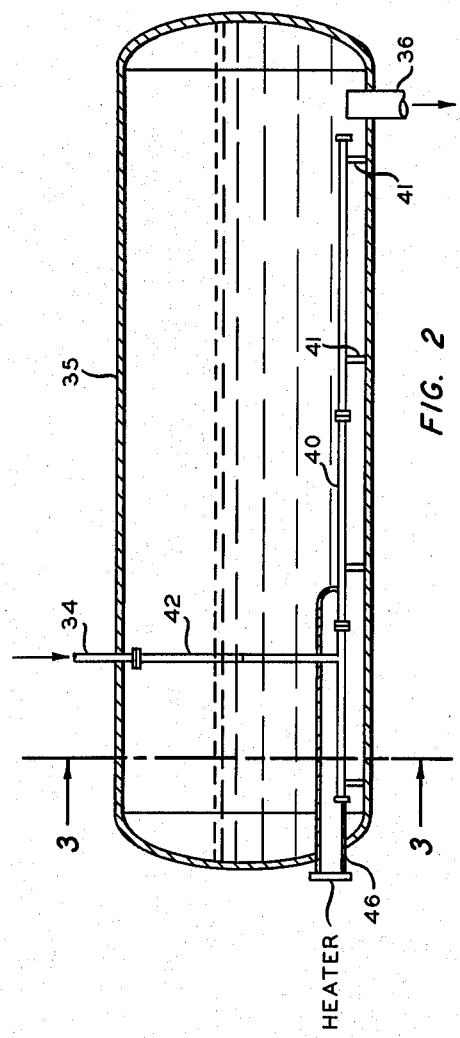
FIGURE 2 is a view, shown partially in section, of the storage tank employed in FIGURE 1.
Figure 4:
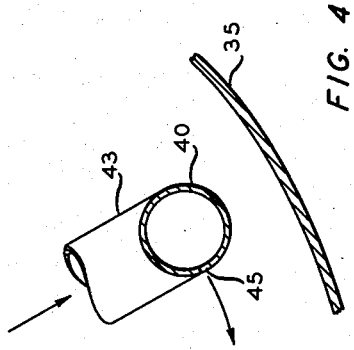
FIGURE 4 is an enlarged view showing details of the slurry introduction into the surge tank.
Figure 3:
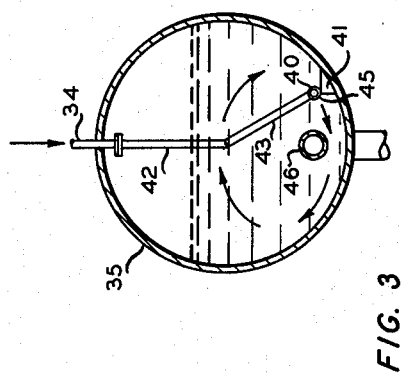
FIGURE 3 is a view taken along line 3—3 in FIGURE 2.

The apparatus of this invention, which prevents polymer fines from settling out in surge tank 35, is illustrated in FIGURES 2, 3 and 4. Surge tank 35 comprises a cylindrical vessel which is positioned such that its axis in a horizontal plane. A header 40 is positioned near the bottom of tank 35 and extends substantially the length of the tank. This header is offset from the center of the tank and rests on a plurality of supports 41. The two ends of the header are closed by blind flanges. An inlet pipe 42 extends vertically from the top of the tank to approximately the mid point thereof. A pipe 43 connects inlet pipe 42 to header 40. As shown in FIGURES 3 and 4, pipe 40 is provided with a plurality of openings 45 which permit the slurry to enter tank 35 in directions generally tangential to the adjacent side wall of the tank. This results in a rolling motion of the tank contents which provides sufficient agitation to retain the polymer fines in suspension. The contents of tank 35 are removed through outlet port 36 as required to operate zone 37 of FIGURE 1 uniformly. A heater 46 can be positioned within tank 35 to maintain the contents at a desired elevated temperature.

In one specific embodiment of this invention, tank 35 had an internal diameter of approximately nine feet. The tank was approximately 40 feet in length. Pipes 42 and 43 and header 40 each had a diameter of four inches. Openings 45 were six inches apart and were ⅝ inch in diameter. Approximately 90% of the polymer fines suspended in cyclohexane were 40 mesh or smaller in size.

The slurry was introduced into tank 35 at a flow rate of approximately 500 gallons per minute. The polymer concentration in the cyclohexane was such that approximately 86 pounds of polymer was introduced into the surge tank per day. The system of this invention has proved to be quite effective in keeping this polymer in suspension so that difficulties are avoided in the downstream equipment.

While this invention has been described in conjunction with a presently preferred embodiment, it obviously is not limited thereto.

What is claimed is:

1. The method of preventing solid particles suspended in a liquid from settling out in a generally cylindrical storage vessel positioned so that the axis thereof is generally horizontal, which comprises introducing the liquid containing suspended particles into the vessel below the surface of the liquid at a plurality of spaced points and in directions generally tangential to the bottom of the vessel and at velocities such that the material within the vessel is agitated sufficiently to retain the solid particles in suspension while the material is retained within the vessel, and subsequently removing the material from the vessel.

2. The method of claim 1 wherein the liquid introduced into the vessel is cyclohexane and the solid particles suspended therein are olefin polymer.

References Cited by the Examiner
UNITED STATES PATENTS

| | | |
|---|---|---|
| 1,601,730 | 10/26 | Faragher. |
| 1,992,261 | 2/35 | Traudt _____ 259—95 X |
| 2,045,752 | 6/36 | Butterworth _____ 134—168 X |
| 2,563,085 | 8/51 | Utsinger _____ 134—22 X |
| 2,692,798 | 10/54 | Hicks _____ 259—95 X |
| 2,854,221 | 9/58 | Jackson _____ 259—4 X |
| 2,900,176 | 8/59 | Krogel _____ 259—4 X |
| 2,978,300 | 4/61 | McCowen _____ 259—95 X |

CHARLES A. WILMUTH, *Primary Examiner.*

GEORGE J. NORTH, *Examiner.*